(12) United States Patent
Moroney

(10) Patent No.: US 11,928,833 B2
(45) Date of Patent: Mar. 12, 2024

(54) GENERATION OF POINTS IDENTIFYING DISPLACED PORTIONS OF AN IMAGE

(71) Applicant: Hewlett-Packard Development Company, L.P., Spring, TX (US)

(72) Inventor: Nathan Moroney, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 263 days.

(21) Appl. No.: 17/414,736

(22) PCT Filed: Apr. 30, 2019

(86) PCT No.: PCT/US2019/029982
§ 371 (c)(1),
(2) Date: Jun. 16, 2021

(87) PCT Pub. No.: WO2020/222815
PCT Pub. Date: Nov. 5, 2020

(65) Prior Publication Data
US 2022/0044432 A1 Feb. 10, 2022

(51) Int. Cl.
*G06T 7/564* (2017.01)
*B29C 64/386* (2017.01)
*G06T 7/12* (2017.01)
*G06T 17/20* (2006.01)
*B33Y 10/00* (2015.01)

(52) U.S. Cl.
CPC ............ *G06T 7/564* (2017.01); *B29C 64/386* (2017.08); *G06T 7/12* (2017.01); *G06T 17/205* (2013.01); *B33Y 10/00* (2014.12)

(58) Field of Classification Search
CPC ......... G06T 7/564; G06T 7/12; G06T 17/205; B29C 64/386; B33Y 10/00; B33Y 50/00

USPC ........ 382/299, 254, 269, 152; 356/444, 446, 356/402, 425, 443
See application file for complete search history.

(56) References Cited

U.S. PATENT DOCUMENTS 4,641,019 A * 2/1987 Inatsuki ............... G03D 15/003
250/201.7
4,884,080 A * 11/1989 Hirahara .................. H04N 1/52
430/293

(Continued)

FOREIGN PATENT DOCUMENTS

WO WO-2018031594 A1 * 2/2018 ........... B29C 64/118

OTHER PUBLICATIONS

Unknown author, "The Unreasonable Effectiveness of Quasirandom Sequences", retrieved from the Internet on Mar. 6, 2019, 43 pages. <http://extremelearning.com.au/unreasonable-effectiveness-of-quasirandom-sequences/>.

(Continued)

*Primary Examiner* — Isiaka O Akanbi
(74) *Attorney, Agent, or Firm* — Shook, Hardy & Bacon L.L.P.

(57) ABSTRACT

According to examples, an apparatus may include a processor and a non-transitory computer readable medium on which is stored instructions that the processor may execute to determine displacement levels of multiple locations of an image and to select a sampling density for the multiple locations. The processor may execute the instructions to generate an array of points according to the selected sampling density, the array of points identifying displaced portions of the image.

15 Claims, 8 Drawing Sheets

(56) References Cited

U.S. PATENT DOCUMENTS

| | | | | |
|---|---|---|---|---|
| 4,890,121 | A * | 12/1989 | Hirahara | G01D 15/10 |
| | | | | 347/184 |
| 5,748,199 | A | 5/1998 | Palm | |
| 7,098,435 | B2 | 8/2006 | Mueller et al. | |
| 7,133,044 | B2 | 11/2006 | Maillot et al. | |
| 7,657,083 | B2 | 2/2010 | Parr et al. | |
| 8,624,893 | B2 | 1/2014 | Grenfell | |
| 8,897,596 | B1 * | 11/2014 | Passmore | H04N 13/257 |
| | | | | 382/284 |
| 9,241,152 | B2 | 1/2016 | Hassebrook et al. | |
| 9,380,292 | B2 * | 6/2016 | McNamer | H04N 13/257 |
| 9,846,949 | B2 | 12/2017 | Moroney | |
| 10,363,704 | B2 * | 7/2019 | Woytowitz | B29C 64/386 |
| 10,529,078 | B2 * | 1/2020 | Abreu | G06V 10/7557 |
| 2002/0158880 | A1 | 10/2002 | Williams et al. | |
| 2005/0168460 | A1 | 8/2005 | Razdan et al. | |
| 2013/0124149 | A1 | 5/2013 | Carr et al. | |
| 2014/0146037 | A1 * | 5/2014 | Sandrew | H04N 13/261 |
| | | | | 345/419 |
| 2015/0243324 | A1 * | 8/2015 | Sandrew | H04N 13/266 |
| | | | | 386/278 |
| 2017/0085733 | A1 * | 3/2017 | Ilic | H04N 13/271 |
| 2018/0139446 | A1 * | 5/2018 | Abello | H04N 19/132 |
| 2019/0228570 | A1 * | 7/2019 | Tran | A61B 5/1079 |
| 2020/0125830 | A1 * | 4/2020 | Lei | G06T 7/90 |
| 2020/0307174 | A1 * | 10/2020 | Woytowitz | B29C 64/393 |
| 2021/0125405 | A1 * | 4/2021 | Tran | G06Q 30/0643 |

OTHER PUBLICATIONS

WikipediA, "Canny edge detector", retrieved from the Internet on Mar. 6, 2019, 7 pages. <https://en.wikipedia.org/wiki/Canny_edge_detector>.

WikipediA, "Colors of noise", retrieved from the Internet on Mar. 6, 2019, 8 pages. <https://en.wikipedia.org/wiki/Colors_of_noise#Blue_noise>.

WikipediA, "Delaunay triangulation", retrieved from the Internet on Mar. 6, 2019, 5 pages. <https://en.wikipedia.org/wiki/Delaunay_triangulation>.

WikipediA, "Edge-preserving smoothing", Retrieved from the Internet on Mar. 6, 2019, 3 pages. <https://en.wikipedia.org/wiki/Edge-preserving_smoothing>.

* cited by examiner

NON-TRANSITORY COMPUTER READABLE MEDIUM
1000

GENERATE, FOR EACH OF A PLURALITY OF LINES, LINE DATA THAT IDENTIFIES IMAGE VALUES AT POSITIONS IN AN INPUT IMAGE CORRESPONDING TO LOCATIONS ALONG THE LINE
1002

DETERMINE, FROM THE GENERATED LINE DATA, EDGE VALUES AT INTERSECTIONS OF THE PLURALITY OF LINES
1004

GENERATE A MAP THAT APPROXIMATES EDGES IN THE INPUT IMAGE FROM THE DETERMINED EDGE VALUES
1006

DETERMINE, FROM THE MAP, A 2D ARRAY OF POINTS THAT SAMPLES EDGES IN THE INPUT IMAGE
1008

APPLY A POST-PROCESSING OPERATION ON THE 2D ARRAY OF POINTS TO GENERATE A 3D REPRESENTATION OF THE 2D ARRAY OF POINTS
1010

GENERATION OF POINTS IDENTIFYING DISPLACED PORTIONS OF AN IMAGE

BACKGROUND

The size of data that corresponds to an image may be based on various features of the image. The features may include, for instance, the resolution of the image, whether the image is in gray scale or in color, the number of points representing the image, etc. Thus, for instance, the size of the data is larger when the number of points corresponding to the image is larger.

BRIEF DESCRIPTION OF THE DRAWINGS

Features of the present disclosure are illustrated by way of example and not limited in the following figure(s), in which like numerals indicate like elements, in which:

FIG. 10 shows a block diagram of a non-transitory computer readable medium that may have stored thereon machine readable instructions for generating a 2D array of points that samples edge representations in an image.

DETAILED DESCRIPTION

Disclosed herein are apparatuses, methods, and computer readable media that may generate an array of points that identify and/or sample displaced portions, e.g., edge portions, of an image. For instance, an apparatus disclosed herein may include a processor that may determine displacement levels of multiple locations of an image, may select a sampling density for the multiple locations, and may generate an array of points according to the selected sampling density, the array of points identifying displaced portions of the image. In one regard, the array of points, which may be a 2D input image, may have a much smaller number of points, e.g., a fraction of the number of points, as compared with an image, e.g., a 2D input image, a slice of a 3D input image, or the like, and thus, the sampling of points may take up a relatively smaller amount of storage space than the input image.

In many instances, processing of images for the storage of image files, displaying of images, and/or for 3D printing takes a large amount of processing and data storage resources. Through implementation of the present disclosure, the amount of processing and data storage resources used for processing operations of images may significantly be reduced and/or minimized. That is, by generating an array of points that identifies the edges, e.g., the distinguishing features, in an input image, such as features having at least a certain luminescence and/or height displacement with respect to neighboring features, may be distinguished from common features, such as features that do not have the certain luminescence and/or height displacement with respect to neighboring features. By way of example, the edge representation disclosed herein may allow for efficient production of 3D printed textures. The edge representation may also be used for other situations in which dense 2D arrays representing 3D surfaces may be transformed to points and meshes.

Before continuing, it is noted that as used herein, the terms "includes" and "including" mean, but is not limited to, "includes" or "including" and "includes at least" or "including at least." The term "based on" means "based on" and "based at least in part on."

Figure 1:
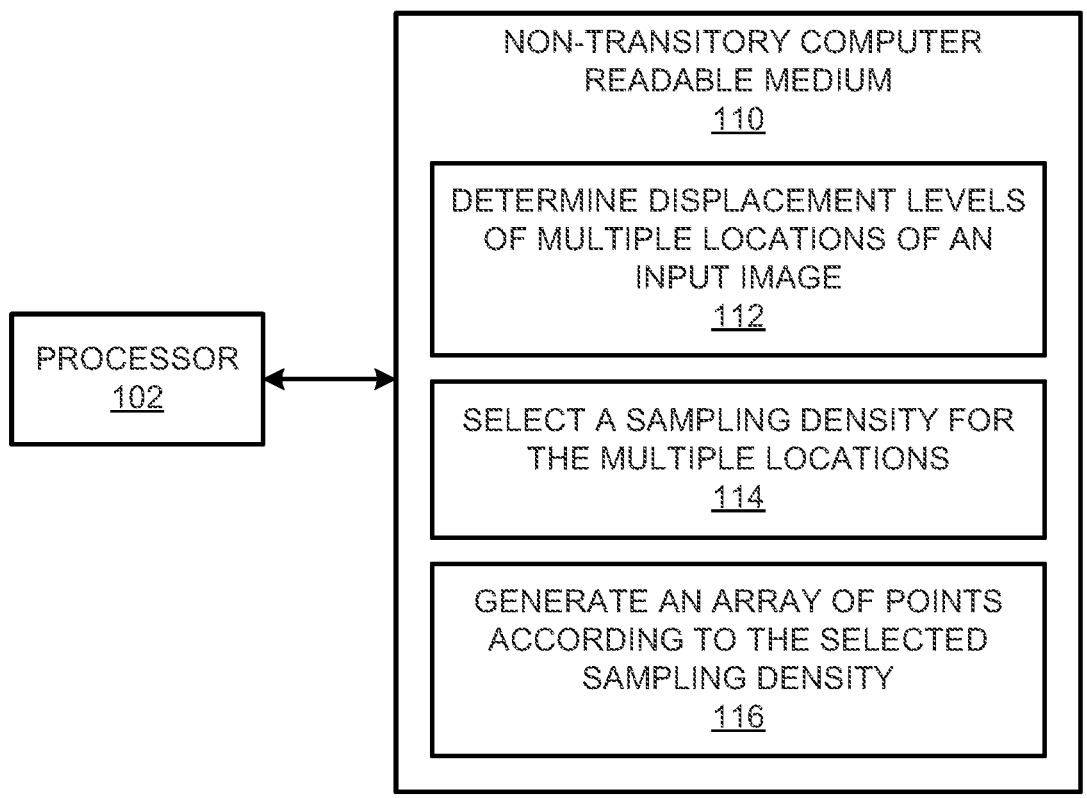
FIG. 1 shows a block diagram of an example apparatus that may generate an array of points that identify displaced portions of an image.
Figure 2:
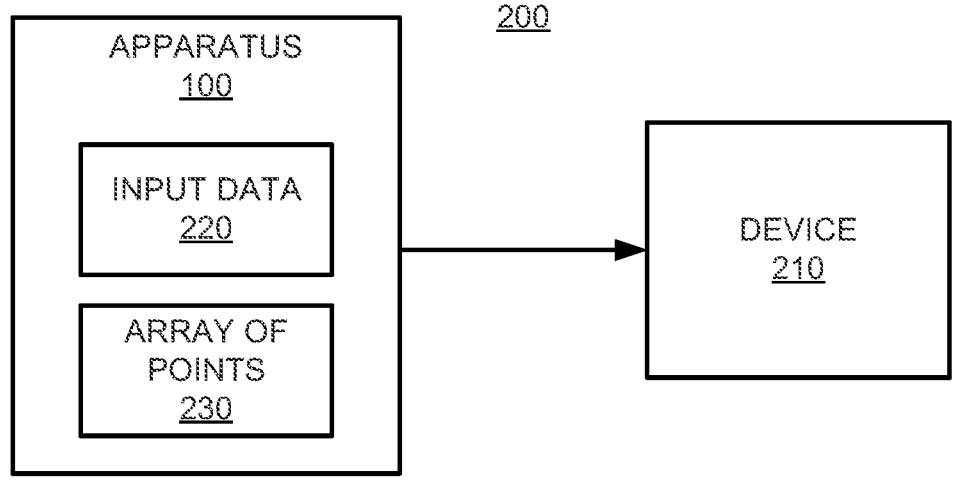
FIG. 2 shows a block diagram of an example system that may include the example apparatus depicted in FIG. 1 and a device.

Reference is first made to FIGS. 1 and 2. FIG. 1 shows a block diagram of an example apparatus 100 that may generate an array of points that sample displaced portions of an input data. FIG. 2 shows a block diagram of an example system 200 that may include the example apparatus 100 depicted in FIG. 1 and a device 210. It should be understood that the apparatus 100 depicted in FIG. 1 and/or the system 200 depicted in FIG. 2 may include additional components and that some of the components described herein may be removed and/or modified without departing from the scopes of the apparatus 100 and/or the system 200 disclosed herein.

The apparatus 100 may be a server computer, a desktop computer, a laptop, or the like. The device 210 may be a two dimensional (2D) printer, a three dimensional (3D) printer, a data storage device, or the like. Generally speaking, the apparatus 100 may access input data 220 and may generate an array of points 230 of the input data 220 that samples displaced portions of the input data 220. The input data 220 may include a 2D image, 3D height displacements, a dense 2D array, or the like. In addition, the displaced portions of the input data 220 may correspond to the portions that represent depth or height of an image represented by the input data 220. That is, the displaced portions of the input data 220 may represent non-flat features, edge representations, or the like, of an image corresponding to the input data 220.

By identifying the non-flat features of an image instead of all of the features of the entire image, data representing the image may be stored and/or processed, in which the data has a relatively smaller size than data that may represent all of the features of the entire image. This may occur because the image may accurately be represented by the non-flat features as the flat features may represent uniform or non-distinguishing areas of the image. In any regard, data corresponding to the array of points 230 may be stored and/or processed instead of the image as the array of points 230 may consume a smaller about of storage space and thus may consume a smaller amount of processing resources than the image. By way of particular example, a post-processing operation may be applied on the array of points 230 to generate a 3D representation of the 2D array of points 230 and a 3D printer 210 may print a 3D object using the 3D representation.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), a graphics processing unit (GPU), and/or other hardware device. The apparatus 100 may also include a non-transitory computer readable medium 110 that may have stored thereon machine readable instructions 112-116 (which may also be termed computer readable instructions) that the processor 102 may execute.

The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

The processor 102 may fetch, decode, and execute the instructions 112 to determine displacement values of multiple locations of an image. That is, the processor 102 may determine the displacement values of an image to which the input data 220 corresponds. The input data 220 may include a 2D image, 3D height displacements, a dense 2D array, or the like. By way of example in which the input data 220 includes a 2D image, the displacement values may correspond to the changes in the apparent heights of features represented in the image as may be represented by difference colors or shadings in the image. As another example in which the input data 220 includes 3D height displacements, the displacement values may correspond to the height displacement values identified in the input data 220. In any regard, the displacement values may identify or signify the depth levels or the height levels of the features of an image represented by the input data 220. Thus, for instance, the processor 102 may determine the locations of an image that have depth or height and thus, the locations at which transitions from flat to non-flat features may be present.

The processor 102 may fetch, decode, and execute the instructions 114 to select a sampling density for the multiple locations. For instance, the processor 102 may select the sampling density based on the determined displacement levels. In this example, the processor 102 may select a higher sampling density in instances in which there are a large number of locations having displacement values that fall below a predefined low value and/or exceed a predefined high value and may select a lower sampling density in instances in which there are a smaller number of locations having displacement values that fall below a predefined low value and/or exceed a predefined high value. As another example, the processor 102 may select the sampling density based on a quasi-random selection of locations. In this example, the processor 102 may select the sampling density through use of a technique, such as blue noise, air diffusion, or the like.

In any regard, the processor 102 may select the sampling density to map non-flat regions on the image represented by the input data 220 to preserve edges (e.g., transitions between flat and non-flat regions, transitions between non-flat regions having different displacement levels, etc.) in the image. As used herein, a non-flat region on the image may include an area that corresponds to a value that is below or above a baseline value, for instance, a baseline height value. Additionally, the processor 102 may select the sampling density to reduce, e.g., minimize, the amount of storage space used to store a representation of the input data 220 while meeting a predetermined accuracy level between the representation and the input data 220.

The processor 102 may fetch, decode, and execute the instructions 116 to generate an array of points according to the selected sampling density, the array of points sampling displaced portions of the image 220. As discussed in greater detail herein, the processor 102 may generate a map that approximates non-flat portions of the image 220 from the sampled locations.

Figure 3:
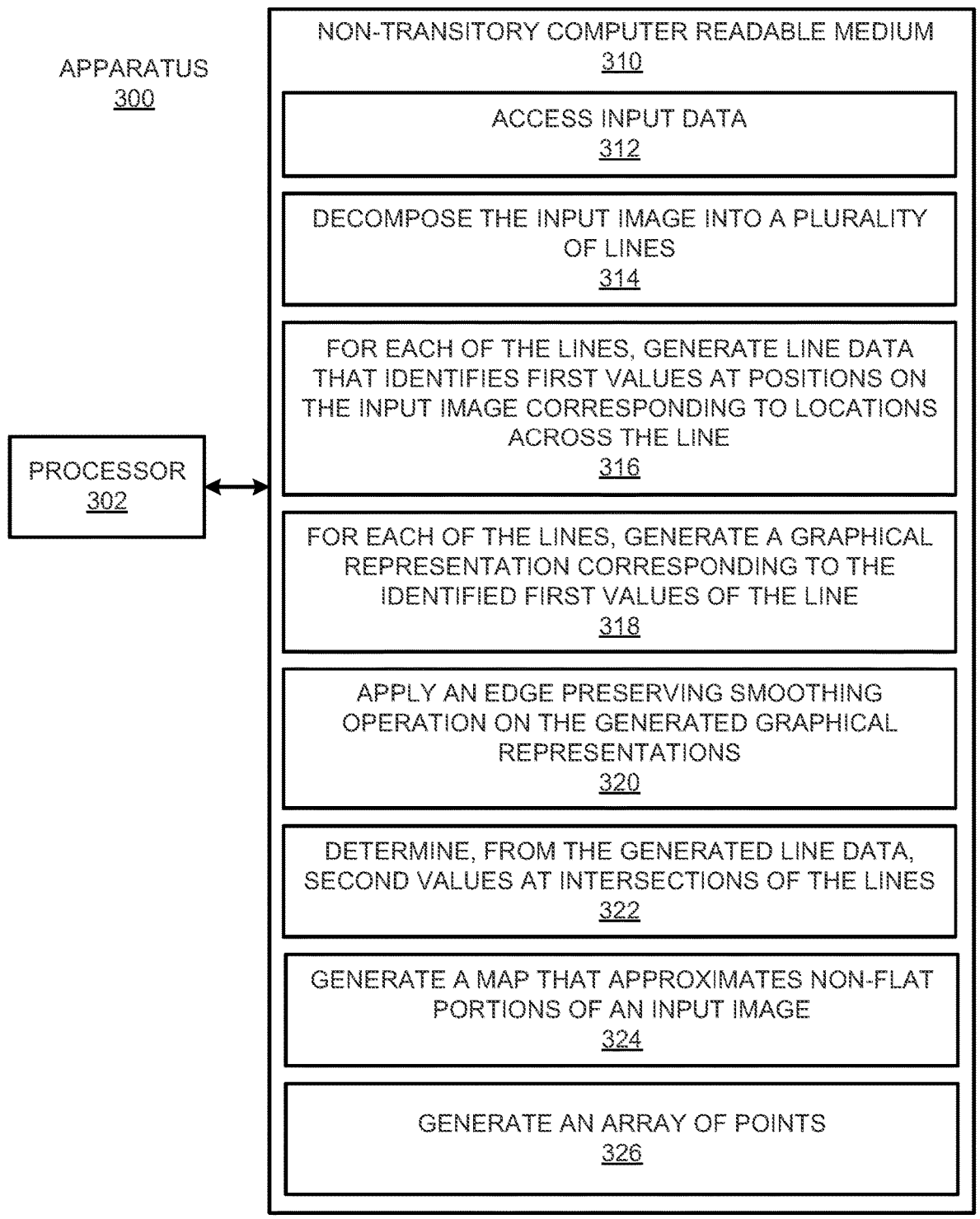
FIG. 3 shows a block diagram of an example apparatus that may generate an array of points that sample displaced portions of input data.

Turning now to FIG. 3, there is shown a block diagram of an example apparatus 300 that may generate an array of points that sample displaced portions of input data 220. It should be understood that the apparatus 300 depicted in FIG. 3 may include additional components and that some of the components described herein may be removed and/or modified without departing from the scope of the apparatus 300 disclosed herein.

The apparatus 300 may be similar to the apparatus 100 depicted in FIG. 1 and may thus be a server computer, a desktop computer, a laptop, or the like. In addition, in FIG. 2, the apparatus 100 may be replaced with the apparatus 300. As shown in FIG. 3, the apparatus 300 may include a processor 302 and a non-transitory computer readable medium 310. The processor 302 may be equivalent to the processor 102 and the non-transitory computer readable medium 310 may be equivalent to the non-transitory computer readable medium 110. Reference will be made to FIGS. 1, 2, and 4A-7 in the description of the apparatus 300.

Figure 4A:
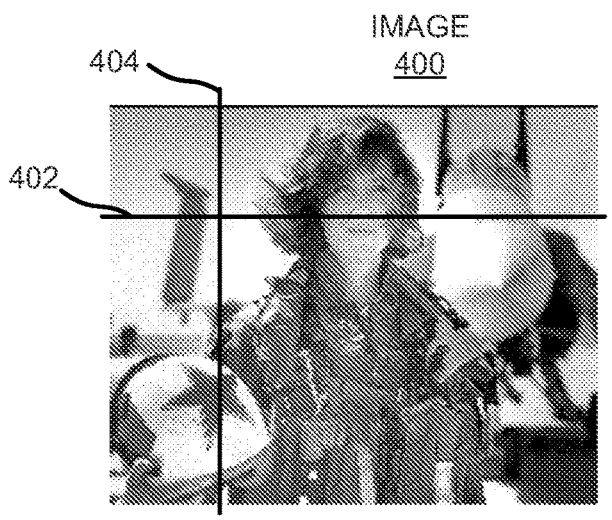
FIG. 4A depicts a sample image for which an array of points that sample displaced portions of the sample image may be generated by the example apparatus depicted in FIG. 3.

The processor 302 may fetch, decode, and execute the instructions 312 to access input data 220. The processor 302 may access the input data 220 from a user, from a data storage device, from the device 210, over a network, or the like. The input data 220 may correspond to an image as discussed herein. A sample image 400 for which an array of points that sample displaced portions of the sample image 400 may be generated by the example apparatus 300 is depicted in FIG. 4A. It should be clearly understood that the image 400 depicted in FIG. 4A is for purposes of illustration and should be not construed as limiting the present disclosure in any respect.

The processor 302 may fetch, decode, and execute the instructions 314 to decompose the image 400 into a plurality of lines. For instance, the processor 302 may perform row and column sampling of the image 400, e.g., a first set of the lines may extend along a first dimension and a second set of the lines may extend along a second dimension, in which the second dimension is perpendicular to the first dimension. A representative horizontal line 402 and a representative vertical line 404 are shown in FIG. 4A. It should be understood that the image 400 may be decomposed into multiple additional lines, although the additional lines are not depicted. Each of the lines may include a height or a width that is equivalent to a pixel of the image 400, although other heights and/or widths may be used. The multiple additional lines may correspond to each of the vertical lines that may extend from a bottom to a top of the image 400 and to each of the horizontal lines that may extend from a first side to a second side of the image 400. In addition, it should be understood that the descriptions of the lines 402 and 404 are applicable to the multiple additional lines.

The processor 302 may fetch, decode, and execute the instructions 316 to, for each of the lines in the plurality of lines, generate line data that identifies first values at positions on the image corresponding to locations across the line. In some examples, the first values may be image data values across the line. For instance, the first values may be intensity values, floating point doubles, high precision millimeter representation of plus or minus displacements, or the like, of the image at the locations across the line. In any regard, the first values may denote displacement levels at the locations across the line.

The processor 302 may fetch, decode, and execute the instructions 318 to, for each line of the plurality of lines, generate a graphical representation corresponding to the identified first values of the line. Examples of a first graphical representation 410, e.g., a first curve, of the first values corresponding to the first line 402 and a second graphical representation 420, e.g., a second curve, of the first values corresponding to the second line 404 shown in FIG. 4A are respectively shown in FIGS. 4B and 4C. In the graphical representation 410, the horizontal axis may denote the position across the first line 402 and the vertical axis may denote the first value at that position. In the graphical representation 420, the horizontal axis may denote the position across the second line 404 and the vertical axis may denote the first value at that position.

Figure 4B:
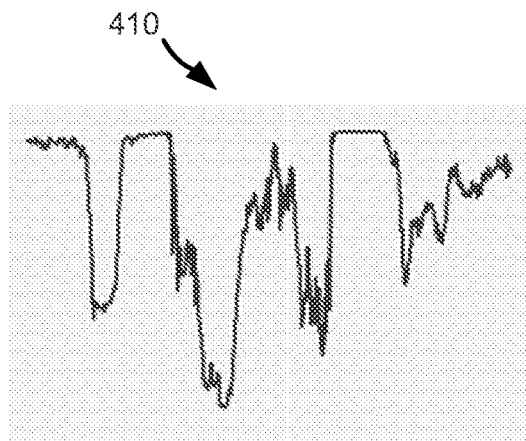
FIGS. 4B-4E, respectively, depict graphical representations of first values corresponding to lines across the image depicted in FIG. 4A.
Figure 4D:
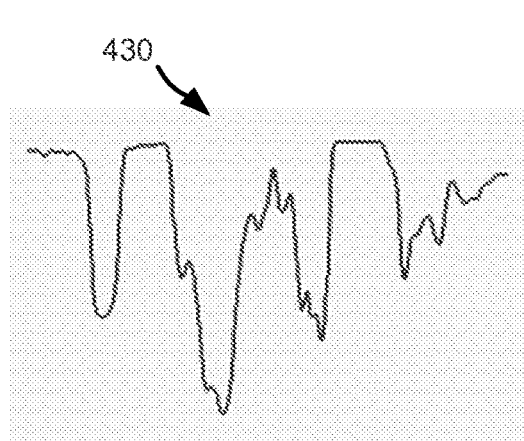
Figure 4C:
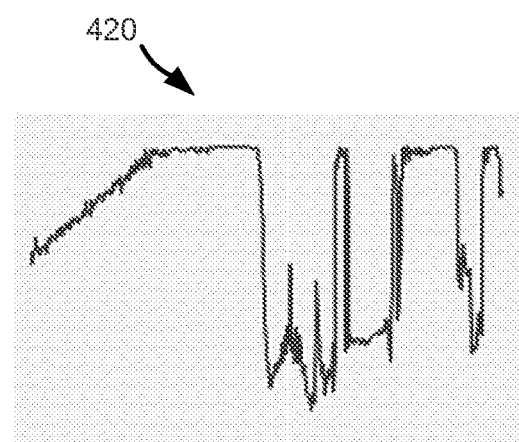
Figure 4E:
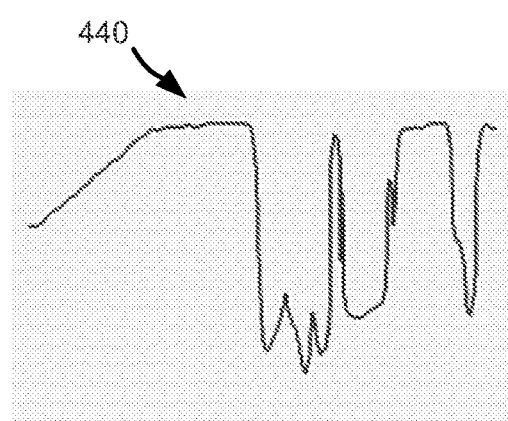

The processor 302 may fetch, decode, and execute the instructions 320 to, for each line of the plurality of lines, apply an edge preserving smoothing operation on the generated graphical representation. The edge preserving smoothing operation may be an operation that may smooth the curves in the graphical representations while preserving sudden transitions in the graphical representations and may also preserves the gradual transitions, such as the gradient of the sky in the image 400. Examples of suitable edge preserving smoothing operations may include bilateral filtering, edge-aware smoothing the median, or the like. In addition, examples of edge-preserved graphical representations 430 and 440 respectively corresponding to the graphical representations 410 and 420 are depicted in FIGS. 4D and 4E.

The processor 302 may fetch, decode, and execute the instructions 322 to determine, from the generated line data, second values at intersections of the plurality of lines, the second values differing from the first values. In some examples, the processor 302 may determine the second values from the first values in the unsmoothed graphical representations. In other examples, the processor 302 may determine the second values from the first values in the edge-preserved smoothed graphical representations. In any of these examples, the second values may correspond to areas of the graphical representations that may denote locations on the image 400 at which edges, e.g., height transitions exist.

The second values at the intersections of the lines may be determined through any suitable determination technique. According to examples, the second values may be determined through a comparison to one another of the points in the graphical representations. Particularly, curves corresponding to points along a graphical representation 410, 420, 430, or 440, spaced a particular distance apart along the graphical representation 410, 420, 430, or 440 may be determined. The distance between the points may be based on a type of image, object, and/or final 3D print product and may be based on a position along the graphical representation 410, 420, 430, or 440. For instance, more points are analyzed using a smaller distance near outer corners of the graphical representation 410, 420, 430, or 440. The distance may be based on the detail desired for a number of edges. For example, sampling points a greater distance apart may result in fewer edges being identified because some edges smaller than the distance may not be identified. The analyzed points may be compared to one another to locate edges along the graphical representation 410, 420, 430, or 440. Determining information about the shape of the graphical representation 410, 420, 430, or 440 may include detecting a first and a second contour and inferring or creating a line to create the two contours.

According to examples, to determine the second values, the processor 302 may determine the curves of the graphical representation 410, 420, 430, or 440 with respect to itself over a curve threshold. For example, the processor 302 may detect the curve based on an analysis of the relative location of the points to determine an area of a curve with respect to itself where the potential curve is created by connecting the analyzed points. The processor 302 may determine the area of the curve with respect to itself, for example, based on an area of a triangle created between the analyzed points, based on an area of a circle created between the analyzed points, or other geometric shape. In other words, the processor 302 may determine, for each line in a first set of lines, first respective areas of curves along the first graphical representation 410 (or the smoothed first graphical representation 430). The processor 302 may also determine, for each line in a second set of lines, second respective areas of curves along the second graphical representation 420 (or the smoothed second graphical representation 440).

The area of the curve (e.g., triangle or other geometric shape representation) may be determined relative to itself instead of or in addition its relation to other portions of the image and/or object. The sign of the area of the curve may be used to determine whether the curve is concave or convex. As an example, the area of a triangle created by the points may be determined by $Area_{Triangle} = |A_x(B_y - C_y) + B_x(C_y - A_6) + C_x(A_y - B_y)|/2$, where A, B, and C are the three points analyzed along the graphical representation 410, 420, 430, or 440 and the x and y values represent the locations of the points. The three points of the triangle may be adjacent sampled points and/or points with sampled points between them. For example, once a curve above the threshold is identified, additional points may be compared to merge with the curve. If the area under the triangle is zero, close to zero, or otherwise under the curve threshold, the portion of the graphical representation 410, 420, 430, or 440 may be assumed to be linear. If not, the portion may be assumed to be a curve.

The curve threshold may be automatically created and/or determined based on user input. The curve threshold may be dynamically determined based on the type of the image. The curve threshold may be set to allow for larger curves to be identified without using information about small curve below the threshold that may not provide valuable information about the overall shape of the object. The curve threshold may be automatically set according to a performance speed goal and/or a curve sensitivity goal.

According to examples, the signs of the areas corresponding to the curves along the graphical representations 410, 420 may be determined. The signs of the areas may correspond to whether the areas are positive or negative. That is, for instance, the areas may have positive signs when the areas correspond to a convex shape and the areas may have negative signs when the areas correspond to a concave shape.

Figure 5A:
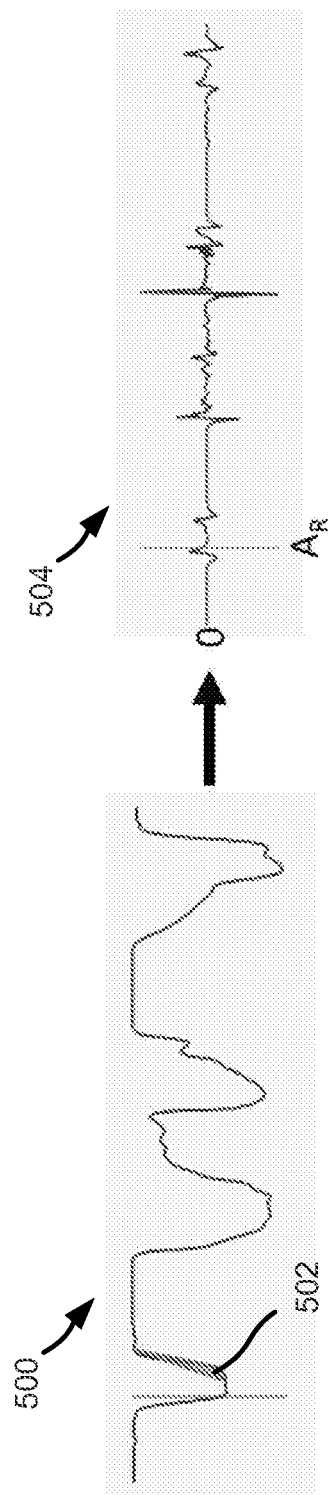
FIGS. 5A and 5B, respectively, depict graphical representations of first values corresponding to lines across the image depicted in FIG. 4A and graphs that denote the areas of curves formed between sets of points along the graphical representations shown in FIGS. 5A and 5B.
Figure 5B:
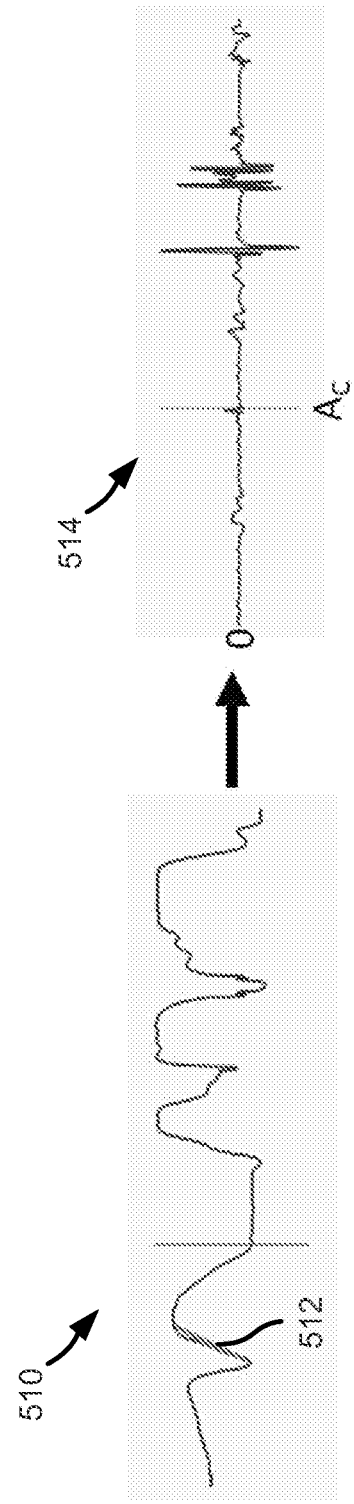

For each of the intersections of the lines across the image 400, the area of the curve corresponding to the horizontal line and the area of the curve corresponding to the vertical line may be determined in the manners discussed above. In addition, for each of the intersections, the areas of the curves corresponding to the horizontal line and the vertical line may be added together to obtain respective volumes at the intersections. Turning now to FIGS. 5A and 5B, there are respectively shown an example manner in which the areas of the segments corresponding to the lines may be determined. Particularly, FIG. 5A shows an example graphical representation 500 of the first values corresponding to a particular row, e.g., horizontal line, and FIG. 5B shows an example graphical representation 510 of the first values corresponding to a particular column, e.g., vertical line.

FIG. 5A also shows a first triangle 502 corresponding to a set of points in the graphical representation 500 as well as a graph 504 that denotes the areas of triangles formed between sets of points across the curve in the graphical representation 500. The graph 504 denotes the area ($A_R$) across a row of the image 400 in which portions of the graph 504 above a reference line correspond to positive area values and the portions of the graph 504 below the reference line correspond to negative area values. Likewise, FIG. 5B shows a second triangle 512 corresponding to a set of points in the graphical representation 510 as well as a graph 514 that denotes the areas of triangles formed between sets of points across the curve in the graphical representation 510. The graph 514 denotes the area ($A_C$) across a column of the image 400 in which portions of the graph 514 above a reference line correspond to positive area values and the portions of the graph 504 below the reference line correspond to negative area values. Although FIGS. 5A and 5B depict that respective areas of triangles 502 and 512 are determined, it should be understood that areas of other types of geometric shapes may be determined without departing from a scope of the present disclosure.

Figure 6:
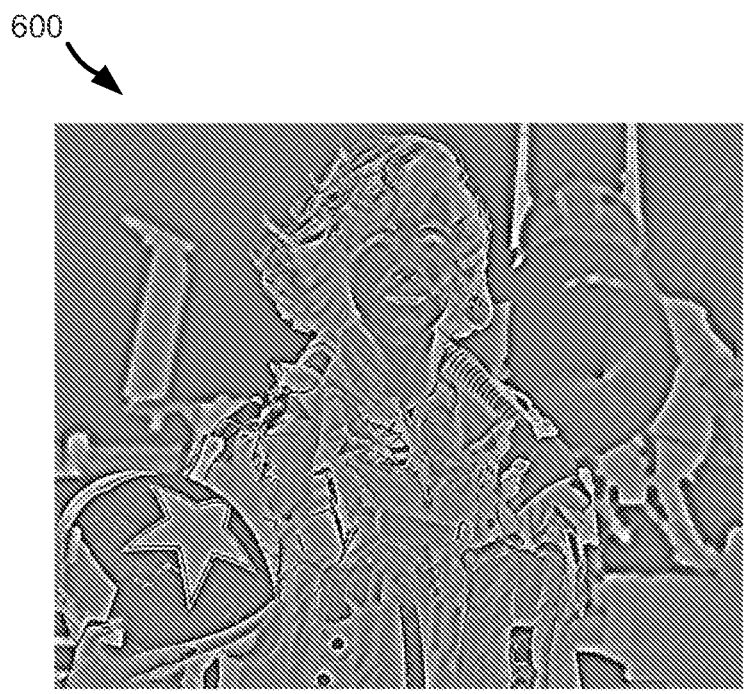
FIG. 6 depicts an example map that approximates non-flat portions of the image shown in FIG. 4A.

With reference back to FIG. 3, the processor 302 may fetch, decode, and execute the instructions 324 to generate a map that approximates non-flat portions of the image 400. An example of a map 600 that approximates the non-flat portions of the image 400 is depicted in FIG. 6. In FIG. 6, the lighter areas may denote non-flat portions that extend above a reference plane, e.g., a plane at which a majority of the plane includes flat portions. In addition, the darker areas may denote non-flat portions that extend below the reference plane. In other examples, the lighter areas may denote non-flat portions that extend below the reference plane and the darker areas may denote non-flat portions that extend above the reference plane.

In some examples, the processor 302 may generate the map 600 based on the determined second values. Particularly, for instance, the processor 302 may determine, for each intersection of the lines in the first set of lines and the lines in the second set of lines, a sum of the first respective area and the second respective area to approximate a non-flat portion of the image 400. That is, for an intersection having a positive sum of areas, the processor 302 may include a light pixel and for an intersection having a negative sum of areas, the processor 302 may include a dark pixel, or vice versa.

Figure 7:
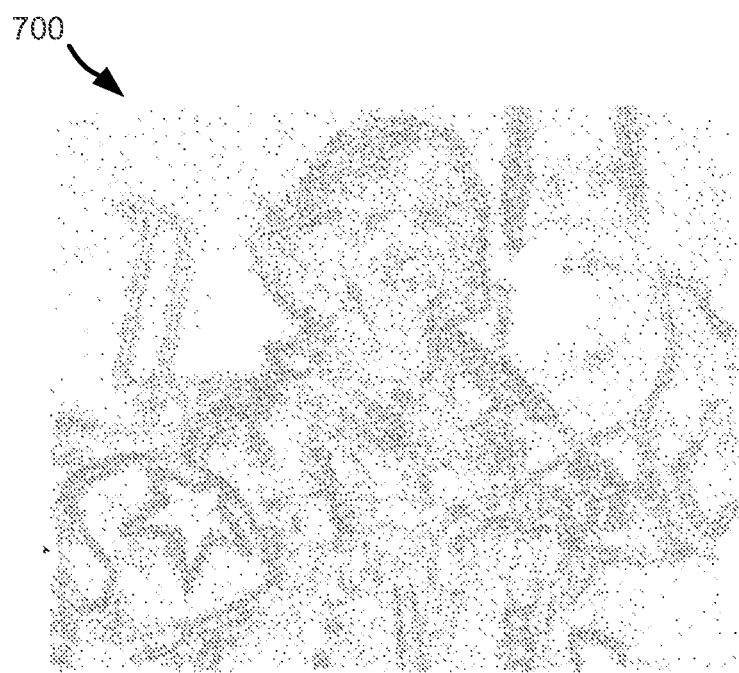
FIG. 7 depicts an array of points that identifies displaced portions of the image shown in FIG. 4A.

With reference back to FIG. 3, the processor 302 may fetch, decode, and execute the instructions 326 to generate an array of points that identifies displaced portions of the image. An example of an array of points 700 that identifies displaced portions, e.g., edge representations, of the image 400 is depicted in FIG. 7. That is, for instance, the processor 302 may determine a dense finite signed 2D array of volumes or volume approximations of the map 600 where a near zero value is flat, a negative value is a concavity and a positive value is a convexity. The processor 302 may also select a sampling density to be applied on the signed array of volumes to sample the volumes. As discussed herein, the sampling density may be selected based on a quasi-random selection of locations on the map 600 or other suitable selection basis. For instance, random selection of the sampling locations may result in an undesirable distribution of the sampling locations, such as some of the sampling locations being positioned sufficiently so close together that unnecessary or redundant points are identified. The quasi-random selection may prevent such undesirable distribution while still enabling some amount of randomness in the selection of the sampling locations as, for instance, the positions of some of the sampling locations may not be random.

In addition, the processor 302 may apply a thresholding on the signed array of volumes to determine the locations of the points in the array of points 700. The thresholding may be applied to identify, for instance, whether a point should be placed at a sampling location. For instance, the processor 302 may determine whether the value at the sampling location exceeds a certain threshold value and if so, the processor 302 may determine that a point is to be placed at that sampling location.

As shown in FIGS. 6 and 7, the array of points 700 may have a significantly smaller number of points than the number of input pixels contained in the map 600. In the examples shown in FIGS. 6 and 7, the array of points 700 may be approximately 1.5% of the number of pixels in the map 600. As such, for instance, the amount of storage space and processing resources for the array of points 700 may be significantly smaller than the amount of storage space and processing resources for the map 600.

Figure 8:
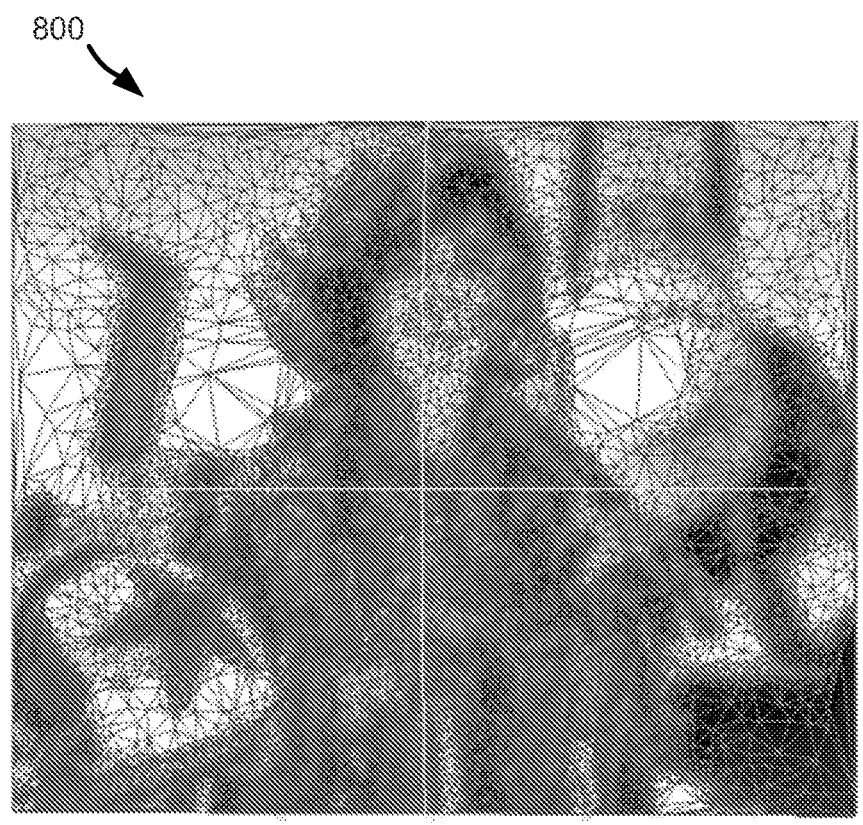
FIG. 8 depicts a triangulated version of the array of points shown in FIG. 7.

In some examples, the processor 302 may store the array of points 700 in a data store (not shown). The processor 302 may store the array of points 700 as generated or may compress the array of points 700 and may store the compressed version of the array of points 700. In addition or in other examples, the processor 302 may apply a post-processing operation on the array of points 700, which may be a 2D array of points to generate a 3D representation of the array of points 700. For instance, the processor 302 may perform a triangulation operation on the array of points 700. A triangulated version 800 of the array of points 700, e.g., triangulated edge representation, is shown in FIG. 8. Particularly, FIG. 8 shows the array of points 700 and a corresponding luminance, lightness, or displacement as taken from the input image 400 depicted in FIG. 4A. The processor 302 may perform a meshing operation on the array of points 700 to define data that a 3D printer may use to print a 3D version of the image 400.

Figure 9:
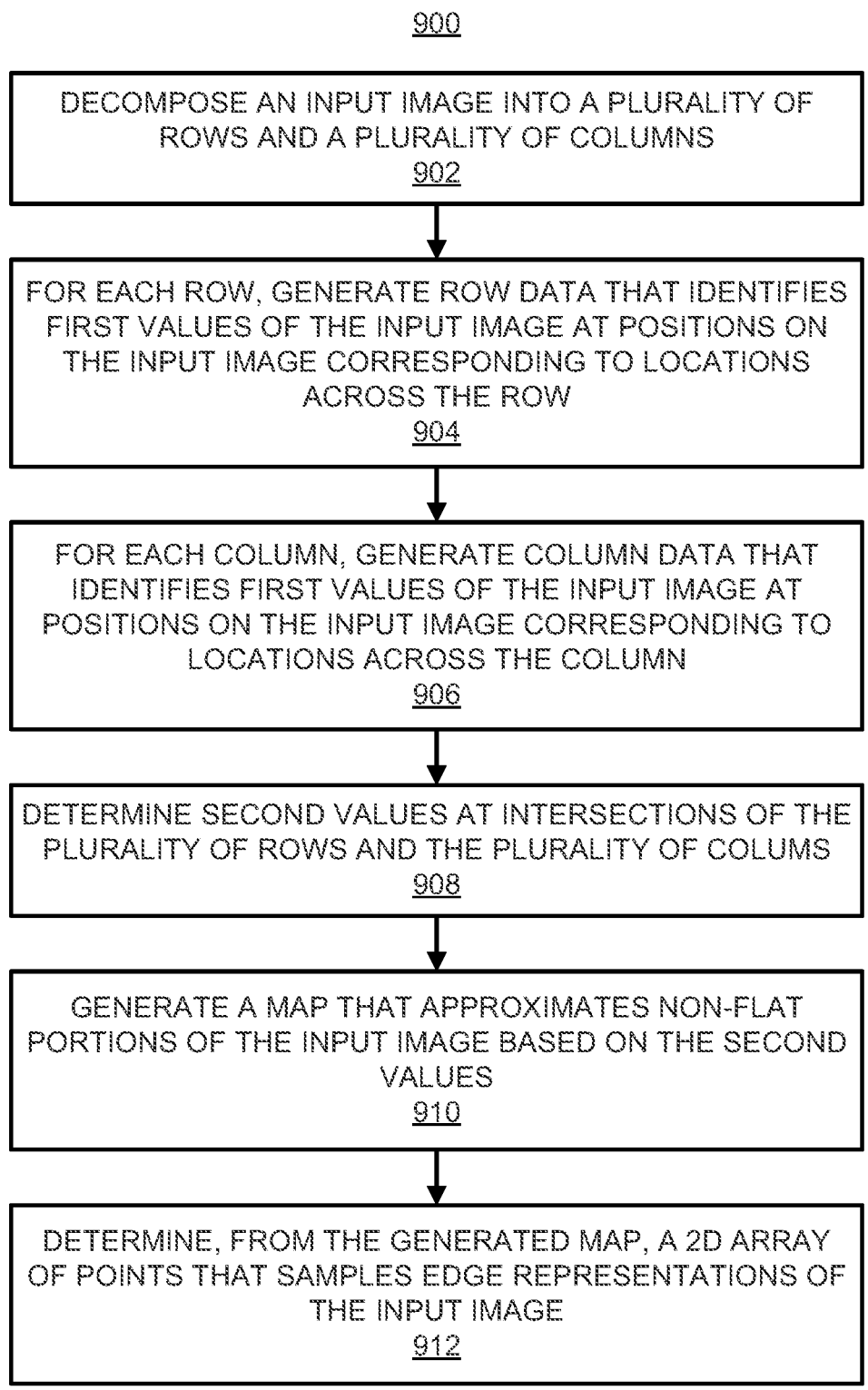
FIG. 9 depicts an example method for determining a 2D array of points that samples edge representations of an image.

Various manners in which the processor 102, 302 may be implemented are discussed in greater detail with respect to the method 900 depicted in FIG. 9. Particularly, FIG. 9 depicts an example method 900 for determining a 2D array of points that samples edge representations of an image. It should be apparent to those of ordinary skill in the art that the method 900 may represent generalized illustrations and that other operations may be added or existing operations may be removed, modified, or rearranged without departing from the scope of the method 900.

The description of the method 900 is made with reference to the apparatus 300 illustrated in FIG. 3 and as well the features depicted in FIGS. 4A-8 for purposes of illustration. It should be understood that apparatuses having other configurations may be implemented to perform the method 900 without departing from the scope of the method 900.

At block 902, the processor 302 may decompose an image 400 into a plurality of rows and a plurality of columns. The plurality of rows and the plurality of columns may correspond to the plurality of lines discussed above with respect to FIG. 4A.

At block 904, the processor 302 may, for each row of the plurality of rows, generate row data that identifies first values of the image 400 at positions on the image 400 corresponding to locations across the row. The row data may be equivalent to the line data determined along a line that extends along a first direction, e.g., horizontally, as discussed above with respect to FIGS. 4A and 4B. As such, for instance, the row data may be used to generate a first graphical representation 410 (FIG. 4B). In addition, the first graphical representation 410 may be smoothed using an edge-preserving smoothing operation to generate a smoothed version 430 (FIG. 4D) of the first graphical representation 410.

At block 906, the processor 302 may, for each column of the plurality of columns, generate column data that identifies first values of the image at positions on the image corresponding to locations across the column. The column data may be equivalent to the line data determined along a line that extends along a second direction, e.g., vertically, as discussed above with respect to FIGS. 4A and 4C. As such, for instance, the column data may be used to generate a second graphical representation 420 (FIG. 4C). In addition, the second graphical representation 420 may be smoothed using an edge-preserving smoothing operation to generate a smoothed version 440 (FIG. 4E) of the second graphical representation 420.

At block 908, the processor 302 may determine, from the generated row and column data, second values at intersections of the plurality of rows and the plurality of columns. The processor 302 may determine the second values at the intersections in manners as discussed above with respect to FIGS. 5A-5D. For instance, for each row of the plurality of rows, the processor 302 may generate a first graphical representation 410 corresponding to the identified first values of the row, determine first curves along the generated first graphical representation, calculate first respective areas of the determined first curves, and generate a first area graphical representation of the calculated first respective areas. The processor 302 may also, for each column of the plurality of columns, generate a second graphical representation corresponding to the identified first values of the column, determine second curves along the generated second graphical representation, calculate second respective areas of the determined second curves, and generate a second area graphical representation of the calculated second respective areas, in which the first respective areas and the second respective areas correspond to the second values.

At block 910, the processor 302 may generate a map 600 that approximates non-flat portions of the image based on the determined second values. The processor 302 may generate the map 600 in any of the manners discussed above with respect to FIG. 6. For instance, for each intersection of the plurality of rows and the plurality of columns, the processor 302 may determine a sum of the first respective area and the second respective area, the sum approximating a non-flat portion of the image at the intersection and may generate the map 600 using the approximated non-flat portions.

At block 912, the processor 302 may determine, from the generated map, a two-dimensional array of points 700 that samples edge representations of the image. The processor 302 may determine the 2D array of points 700 in any of the manners discussed above with respect to FIG. 7. In addition, the points in the 2D array of points 700 may correspond to the edge representations of the image 400. The processor 302 may store the 2D array of points 700 in a data store and/or may transmit the 2D array of points 700 to another device through a local and/or remote connection.

Additionally or alternatively, the processor 302 may generate a 3D representation 800 of the 2D array of points 700 as discussed above with respect to FIG. 8. The processor 302 may further store the 3D representation 800 in a data store and/or may cause a 3D object to be printed using the generated 3D representation 800. That is, for instance, the 3D representation 800 may include mesh data that a 3D printer may use to print the 3 object.

Some or all of the operations set forth in the method 900 may be included as utilities, programs, or subprograms, in any desired computer accessible medium. In addition, the method 900 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 10, there is shown a block diagram of a non-transitory computer readable medium 1000 that may have stored thereon machine readable instructions for determining a 2D array of points that samples edge representations in an image. It should be understood that the computer readable medium 1000 depicted in FIG. 10 may include additional instructions and that some of the instructions described herein may be removed and/or modified without departing from the scope of the computer readable medium 1000 disclosed herein. The computer readable medium 1000 may be a non-transitory computer readable medium. The term "non-transitory" does not encompass transitory propagating signals.

The computer readable medium 1000 may have stored thereon machine readable instructions 1002-1010 that a processor, such as the processor 102 depicted in FIG. 1 and the processor 302 depicted in FIG. 3, may execute. The computer readable medium 1000 may be an electronic, magnetic, optical, or other physical storage device that contains or stores executable instructions. The computer readable medium 1000 may be, for example, a Random Access memory (RAM), an Electrically Erasable Programmable Read-Only Memory (EEPROM), a storage device, an optical disc, and the like.

The processor may fetch, decode, and execute the instructions 1002 to generate, for each line in a plurality of lines, line data that identifies image values at positions in an image 400 corresponding to locations along the line, in which each of the lines intersects with a plurality of other lines in the plurality of lines. The processor may fetch, decode, and execute the instructions 1004 to determine, from the generated line data, edge values at intersections of the plurality of lines. The processor may fetch, decode, and execute the instructions 1006 to generate a map that approximates edges in the image from the determined edge values. The processor may fetch, decode, and execute the instructions 1008 to determine, from the generated map, a two-dimensional array of points that samples edges in the image. The processor may fetch, decode, and execute the instructions 1010 to apply a post-processing operation on the two-dimensional array of points to generate a three-dimensional representation of the two-dimensional array of points.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that when executed by the processor, are to cause the processor to:
   determine displacement levels of multiple locations of an image, the displacement levels corresponding to a depth or a height at the multiple locations;
   select a sampling density for the multiple locations based on the displacement levels; and
   generate an array of points according to the selected sampling density, the array of points identifying displaced portions of the image, the displaced portions corresponding to edge representations in the image.

2. The apparatus of claim 1, wherein to determine the displacement values of the various locations, the instructions are further to cause the processor to:
   decompose the image into a plurality of lines, wherein each of the plurality of lines intersects with a plurality of other lines in the plurality of lines;
   for each line in the plurality of lines, generate line data that identifies first values at positions on the image, the positions corresponding to locations across the line;
   determine, from the generated line data, second values at intersections of the plurality of lines, the second values differing from the first values and corresponding to the edge representations in the image; and
   based on the determined second values, generate a map that approximates non-flat portions of the image.

3. The apparatus of claim 2, wherein to generate the array of points, the instructions are further to cause the processor to determine, from the generated map, a two-dimensional array of points that samples non-flat features of the image.

4. The apparatus of claim 3, wherein the instructions are further to cause the processor to:
   apply a post-processing operation on the two-dimensional array of points to generate a three-dimensional representation of the two-dimensional array of points.

5. The apparatus of claim 3, wherein the instructions are further to cause the processor to:
   apply a sampling process based on the selected sampling density on the generated map to determine the two-dimensional array of points.

6. The apparatus of claim 2, wherein the instructions are further to cause the processor to:
   for each line of the plurality of lines,
      generate a graphical representation corresponding to the identified first values of the line;
      apply an edge-preserving smoothing operation on the generated graphical representation to generate the line data; and
      determine the second values at the intersections of the plurality of lines from the smoothed graphical representations.

7. The apparatus of claim 2, wherein a first set of the plurality of lines extends along a first dimension and a second set of the plurality of lines extends along a second dimension, the second dimension being perpendicular to the first dimension, and wherein the instructions are further to cause the processor to:
   for each line of the first set of the plurality of lines,
      generate a first graphical representation corresponding to the identified first values of the line;
      determine first curves along the generated first graphical representation;
      calculate first respective areas of the determined first curves; and
      generate a first area graphical representation of the calculated first respective areas;
   for each line of the second set of the plurality of lines,
      generate a second graphical representation corresponding to the identified first values of the line;
      determine second curves along the generated second graphical representation;
      calculate second respective areas of the determined second curves; and
      generate a second area graphical representation of the calculated second respective areas, wherein the first respective areas and the second respective areas correspond to the second values.

8. The apparatus of claim 7, wherein the instructions are further to cause the processor to, for each intersection of the lines in the first set of the plurality of lines and lines in the second set of the plurality of lines, determine a sum of the first respective area and the second respective area to approximate a non-flat portion of the image at the intersection and to generate the map using the approximated non-flat portions.

9. A method comprising:
   decomposing, by a processor, an image into a plurality of rows and a plurality of columns;
   for each row of the plurality of rows, generating, by the processor, row data that identifies first values of the image at positions on the image corresponding to locations across the row;
   for each column of the plurality of columns, generating, by the processor, column data that identifies first values of the image at positions, the positions on the image corresponding to locations across the column;
   determining, by the processor, from the generated row and column data, second values at intersections of the plurality of rows and the plurality of columns, the second values corresponding to the edge representations;
   generating, by the processor, a map that approximates non-flat portions of the image based on the determined second values; and
   determining, by the processor, from the generated map, a two-dimensional array of points that samples edge representations of the image.

10. The method of claim 9, further comprising:
    generating a three-dimensional representation of the two-dimensional array of points; and
    printing a three-dimensional object using the generated three-dimensional representation.

11. The method of claim 9, further comprising:

for each row of the plurality of rows, generating a first graphical representation corresponding to the identified first values of the row;

determining first curves along the generated first graphical representation;

calculating first respective areas of the determined first curves; and generate a first area graphical representation of the calculated first respective areas;

for each column of the plurality of columns, generating a second graphical representation corresponding to the identified first values of the column;

determining second curves along the generated second graphical representation;

calculating second respective areas of the determined second curves; and generating a second area graphical representation of the calculated second respective areas, wherein the first respective areas and the second respective areas correspond to the second values.

12. The method of claim 11, further comprising:

for each intersection of the plurality of rows and the plurality of columns, determining a sum of the first respective area and the second respective area, the sum approximating a non-flat portion of the image at the intersection and generating the map using the approximated non-flat portions.

13. The method of claim 11, further comprising:

smoothing the first graphical representations, wherein determining the first curves further comprises determining the first curves along the smoothed first graphical representations; and smoothing the second graphical representations, wherein determining the second curves further comprises determining the second curves along the smoothed second graphical representations.

14. A non-transitory computer readable medium on which is stored machine readable instructions that when executed by a processor, cause the processor to:

generate, for each line in a plurality of lines, line data that identifies image values at positions in an image corresponding to locations along the line, wherein each of the lines intersects with a plurality of other lines in the plurality of lines;

determine, from the generated line data, edge values at intersections of the plurality of lines;

generate a map that approximates edges in the image from the determined edge values; and determine, from the generated map, a two-dimensional array of points that samples edges in the image.

15. The non-transitory computer readable medium of claim 14, wherein the instructions are further to cause the processor to:

apply a post-processing operation on the two-dimensional array of points to generate a three-dimensional representation of the two-dimensional array of points.

* * * * *